(12) United States Patent
Cheniuntai et al.

(10) Patent No.: US 12,691,605 B2
(45) Date of Patent: Jul. 28, 2026

(54) MIXING AND FEEDING SYSTEM FOR 3D PRINTING OF BUILDINGS

(71) Applicant: Apis Cor Inc., Melbourne, FL (US)

(72) Inventors: Anna Cheniuntai, Melbourne, FL (US); Nikita Cheniuntai, Melbourne, FL (US)

(73) Assignee: APIS COR INC., Melbourne, FL (US)

( * ) Notice: Subject to any disclaimer, the term of this patent is extended or adjusted under 35 U.S.C. 154(b) by 0 days.

(21) Appl. No.: 18/808,750

(22) Filed: Aug. 19, 2024

(65) Prior Publication Data

US 2025/0170748 A1 May 29, 2025

Related U.S. Application Data

(63) Continuation of application No. 17/128,662, filed on Dec. 21, 2020, now abandoned.

(60) Provisional application No. 62/951,616, filed on Dec. 20, 2019.

(51) Int. Cl.
B28B 1/00 (2006.01)
B33Y 30/00 (2015.01)

(52) U.S. Cl.
CPC .............. B28B 1/001 (2013.01); B33Y 30/00 (2014.12)

(58) Field of Classification Search
CPC ......... B28B 1/001; B28B 3/228; B33Y 30/00; B28C 5/0893; B28C 5/1246; B28C 5/1261; B28C 7/00; B28C 7/04; B28C 7/0486; B28C 7/049; B28C 7/0495; B28C 7/14; B28C 7/16; B28C 7/163; B28C 9/02; B28C 9/04; B28C 9/0409; B28C 9/0427; B29C 64/20; B29C 64/30; B29C 64/307; B29C 64/314; B29C 64/329; B29C 64/336; E04G 21/00
See application file for complete search history.

(56) References Cited

U.S. PATENT DOCUMENTS

| | | | | |
|---|---|---|---|---|
| 2008/0101150 A1* | 5/2008 | George | .................. | B01F 23/53 |
| | | | | 366/8 |
| 2008/0121013 A1* | 5/2008 | Khoshnevis | ............ | F04B 15/02 |
| | | | | 92/57 |
| 2016/0207701 A1* | 7/2016 | Ernest, Jr. | ............. | B28C 7/0472 |
| 2020/0282593 A1* | 9/2020 | Le Roux | ................. | E04G 21/04 |

* cited by examiner

*Primary Examiner* — Galen H Hauth
*Assistant Examiner* — Baileigh Kate Darnell
(74) *Attorney, Agent, or Firm* — Kenealy Vaidya LLP

(57) ABSTRACT

The present invention is a mixing and feeding system for 3D printing of buildings, designed for extruding highly viscous construction material with a high setting speed. The invention ensures consistent quality of material mixture and does not depend on external and unpredictable factors. The system utilizes a piston water dispenser, a single horizontal brushless motor, water metering nozzles, a pneumatic clutch, separation of wet and dry areas, an optional high pressure washer, and an automatic release of flushing balls for additional and autonomous cleaning. Any extruder should be installed as close as possible to the dispenser supply line of the present invention, such that the system sensors may detect the proper dose of mixed material.

8 Claims, 6 Drawing Sheets

413

MIXING AND FEEDING SYSTEM FOR 3D PRINTING OF BUILDINGS

CROSS-REFERENCE TO RELATED APPLICATIONS

This application is a continuation of, and claims priority to, U.S. application Ser. No. 17/128,662, filed Dec. 21, 2020, the entire disclosure of which is hereby incorporated by reference. Such U.S. application Ser. No. 17/128,662 claims priority to U.S. Provisional Patent No. 62/951,616, filed Dec. 20, 2019, which is incorporated herein by reference in its entirety.

FIELD OF THE INVENTION

This invention relates to the three-dimensional (3D) printing of buildings, and particularly to mixing and feeding systems which provide a material used for the 3D printing of buildings.

BACKGROUND OF THE INVENTION

Overcoming the limitations of prior art within the construction industry will enable architects to more efficiently construct their designs using semi-robotic or fully automated construction systems that incorporate additive manufacturing, Computer Assisted Design (CAD) technology, and systems integration models (e.g., Build Information Modeling-BIM), reducing required human intervention, and further improving speed safety, sustainability, and energy efficiencies, and furthermore providing design and construction diversity and flexibility without excessive construction costs.

The full-scale mixing and feeding system of the present invention provides the construction industry with more sustainable, and more ecological construction technology that constructs superior reinforced structures at lower time and costs, producing significantly less onsite waste and employing more environmentally friendly materials, and requiring very low levels of energy. Employing fast-setting and strong building materials and opportunities, 3D printing will likely herald a third industrial revolution which will benefit from the mixing and feeding system described herein.

SUMMARY OF THE INVENTION

The present invention comprises a mixing system, a flushing ball release mechanism; and a mixture dispenser, which combine into an autonomous system for preparing and releasing the material required for 3D printing of buildings. The mixing system comprises the following components:

Hopper—(1);
Horizontal mixing chamber—(2);
Vertical mixing chamber—(3);
Main progressive cavity pump—(4);
Piston water dispenser—(5);
BLDC motor for horizontal mixing chamber—(6);
BLDC motor for vertical mixing chamber—(7);
High pressure pump—(8);
Horizontal kneading shaft—(9);
Vertical kneading shaft—(10);
Dry material auger—(11);
Air compressor—(12);
Pneumatic clutch—(13);

Drive shaft of the water dispenser—(14);
Pneumatic soft hose pinch cylinder—(15);
Soft hose for separation of dry and wet areas—(16);
Mix supply line from the mixing system to the dispenser—(17);
Rotary unit supplying high pressure water for cleaning the vertical chamber—(18);
Mechanism for installing flushing balls—(19);
Lubrication system—(20);
Tracks and/or wheels—(21);
Water dosing nozzles—(22);
Additional cleaning nozzle—(23).
The flushing ball release mechanism comprises the following components:
Turret with mounted flushing balls (31);
Rotatable pneumatic cylinder for rotating the turret (or a typical rotary cylinder) (32);
Clamping pneumatic cylinder (33);
Feed line to the dispenser (17);
Pushers 1 and 2 (36).
The mixture dispenser comprises the following components:
Dosage progressive cavity pump (41);
BLDC motor with planetary gearbox (42);
Force sensor, for recording and controlling the pressure inside (43);
Dispenser chamber (44).
The line-switching system of the mixture dispenser, which is required for switching between mixing and cleaning modes, comprises the following components:
Hollow rod hydraulic cylinder(s) (45);
Ultrasonic sensor (46);
Pneumatic ram cylinder (47);
Pressure supply plunger (48), for supplying pressure to the hollow rod hydraulic cylinder(s) (45);
Rotary cylinder (49), for switching channels;
Mixture supply line from the kneading system to the batcher (410);
Feed line of the mixture from the dispenser to the extruder (411);
Slider, for moving the supply lines of the mixture to bypass the dosage progressive cavity pump of the dispenser (412);
Bypass pipe (413).

DETAILED DESCRIPTION OF THE PREFERRED EMBODIMENT

Figure 1:
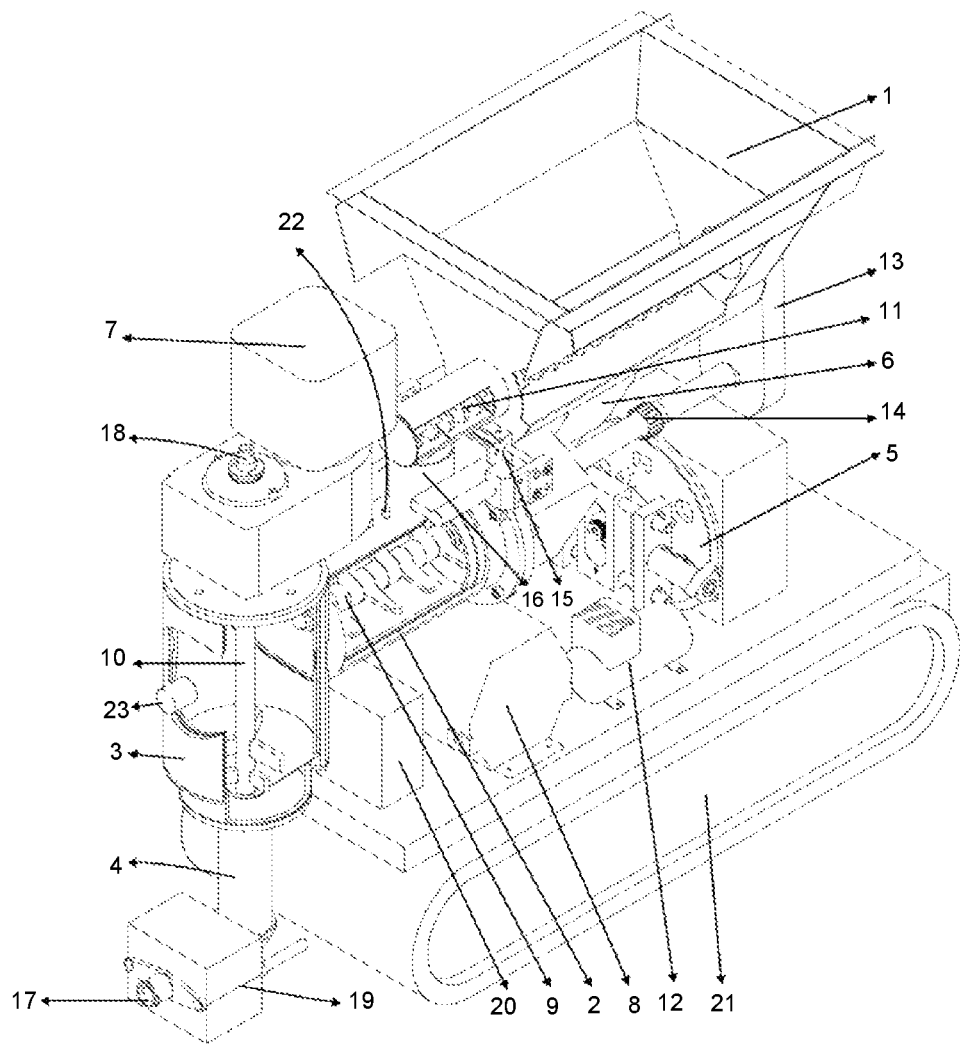
FIG. 1 shows a perspective view of the mixing system of the present invention.

The 3D printer mixing system of the present invention is designed for high viscosity construction materials having a standard required high setting speed, and it is preferred that the system work continuously for several 24-hour periods. The system further should ensure consistency in the quality of the mixture and should not depend on external factors, such as voltage drops during operation or pressure drops in incoming water. The system should also comprise compatible control interfaces, such as EtherCat or CAN or RS-485, for synchronizing work with a construction printer, and any other sensors necessary for monitoring the operation of the equipment. To achieve best results, the following features of the present invention are recommended.

First Feature

By using a piston water dispenser (5) within the pump of the mixing system, the pump is not affected by external factors, such as incoming water pressure in the line to which the pump is connected. Furthermore, the pump has an adjustable capacity over a wide range, making it universal for use in any mixing systems for 3D building printing technology.

Second Feature

The piston water dispenser (5) and an auger for feeding dry material (11) are connected via hoses and/or tubes into a horizontal mixing chamber (2) having a single motor (6).

In the case of an increase in the load on the motor or unstable electricity in the network, the motor will spin slower or faster according to a controlling processor, in order to maintain proper speed during operation. The water-to-solid ratio is never changed because the system for dispensing a dry mixture and the system for dispensing water are connected mechanically and are controlled by the one motor.

One revolution of the auger for feeding dry material (11) also always provides the same output. Similarly, for one revolution of the shaft of the piston water dispenser (5), the pump always provides the same water volume output. In a situation where the motor starts to spin more slowly, less dry mixture is supplied, and less water is similarly supplied, which allows for the continuous maintenance of a consistent water-to-solid ratio within the horizontal mixing chamber.

Third Feature

Another problem of the prior art is the sticking of material to the walls of the mixing chambers (2, 3), and the sticking of the same to the mixing shafts (9, 10). This is due to the fact that, for the purposes of 3D construction printing, a sufficiently viscous material that quickly hardens must be used. To solve this problem, the present invention provides for water to be fed into the horizontal mixing chamber (2) at a pressure of 500-1200 psi through several water metering nozzles (22), the water metering nozzles being built into (i.e., a part of) the horizontal mixing chamber (2). As a result of the water metering nozzles, the injecting of water provides both a dose of water for mixing and a cleaning of the horizontal mixing chamber (2) and the horizontal mixing shaft (9). Vertical water metering nozzle (23) provides for a similar functionality for the vertical mixing chamber (3) and the vertical mixing shaft (10).

Fourth Feature

The dry material auger (11) is driven by a pneumatic clutch (13). This feature allows to mechanically shut off the supply of the dry mixture to the horizontal mixing chamber (2) when it is necessary to stop the operation of the equipment and to wash the horizontal mixing chamber (2) and the horizontal mixing shaft (9). This operating mode is referred to herein as the cleaning mode. When the pneumatic clutch (13) mechanically disconnects the dry feed auger (11), the horizontal BLDC motor (6) rotates the water dispenser piston (5) and the horizontal kneading shaft (9) to which water is supplied, but it does not rotate the dry feed auger. As a result, the dry mixture no longer enters the horizontal mixing chamber (2), and the horizontal mixing chamber may be cleaned with water via the water metering nozzles (22).

Fifth Feature

Separation of dry and wet areas is further provided by the pinching of a soft hose located between respective areas. During the mixing process, water vapor forms as a result of the operation of the water metering nozzles (22). The vapor will reach the borders located between the dry and wet zones within the system. The dry mixture that settles on the walls of the soft hose separating the dry and wet zones also freezes, forming unwanted material on the inside of the soft hose. For this reason, in the process of switching between mixing and cleaning modes, a pneumatic cylinder (15) for clamping the soft hose is activated, which presses against the soft hose (16) in order to further seal the dry zones from the wet zones. Any formed solid material thereby falls off from the force of the clamping or alternatively, as a result of the use of the pneumatic cylinder which causes the periodic pinching and releasing of the soft hose, does not form sufficient deposits to disrupt the operation of the equipment.

Sixth Feature

The mixing system may utilize an optional high-pressure washer for cleaning. An additional high-pressure pump (8) is installed on the mixing system in order to flush the vertical mixing chamber (3) and the vertical kneading shaft (10) at the end of a mixing operation. The additional high-pressure cleaning system increases the reliability of the equipment and further reduces the risk of unwanted material deposits.

Seventh Feature

The mixing system comprises brushless DC (BLDC) motors for the mixing of the dry material and water. The mixing system equipment may be brought to a construction site where there are no sufficient power sources. If the 3D printer being fed by the mixing system can be connected to one phase, then the kneading system requires 3-phase industrial electricity, 380-460V. To solve this problem, BLDC motors (6, 7) are used within the present invention. The BLDC motors' small size and high torque, powered by 24-72 V DC, benefit the portability of the mixing system and printing technology. To power the BLDC motors, a small power pack of lithium batteries is sufficient to ensure the operation of the mixing system. This solution avoids the need to provide a large generator and 3 phases. A 1-phase generator will ensure the operation of the mixing system and a connected printer.

Eighth Feature

Figure 5:
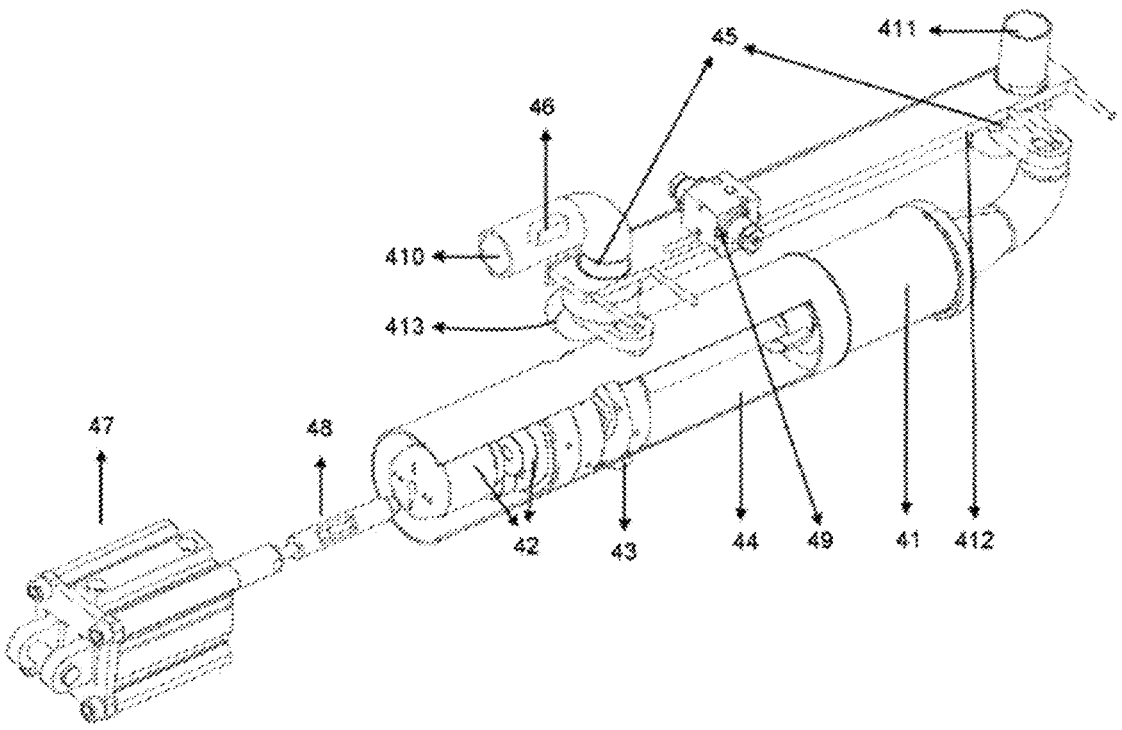
FIG. 5 shows a perspective view of the mixture dispenser of the present invention.

The invention further provides for the automatic release of flushing balls for cleaning the mixture supply lines (17) (reference numeral 17 connects to reference numeral 410 in FIG. 5, via a hose/tube). The present technology becomes even more effective by the autonomous release of flushing balls. Since the mixing system works with materials that quickly harden and this material is fed through hoses, there is always a risk that the material will harden in the hose as well as in the mixing system, so finding the operator and requiring manual input is nearly always necessary during operation. To avoid this, the mixing system of the present invention is equipped with an automatic flushing ball release mechanism for cleaning the mixture supply line. This allows for the start of an automatic cleaning mode in case of any errors which may also be automatically detected. In the case of automated release of flushing balls according to the present invention, no operator is required to be present or available.

Ninth Feature

The mixing system utilizes a mixture dispenser, which is installed as close as possible to the extruder of any connected 3D printer. The mixture dispenser allows an operator to accurately dose the material by increasing or decreasing the flow of the mixture in accordance with a changing trajectory and/or speed of the extruder head itself A mixture dispenser is desirable for efficient printing because construction printers are large in size and mass, and it is difficult for such printers to maintain the same speed of the extruder during a trajectory change; therefore, for effective processes, the printer needs to slow down at corners or during complex paths and/or trajectories, and, in contrast, to accelerate during long, straight sections of print. The mixture dispenser allows for less impact to be based on the speed and trajectory by providing a separate manner to vary the amount of mixture flowing out of the extruder, e.g., as a function of the speed and/or trajectory of the printer head.

Figure 2:
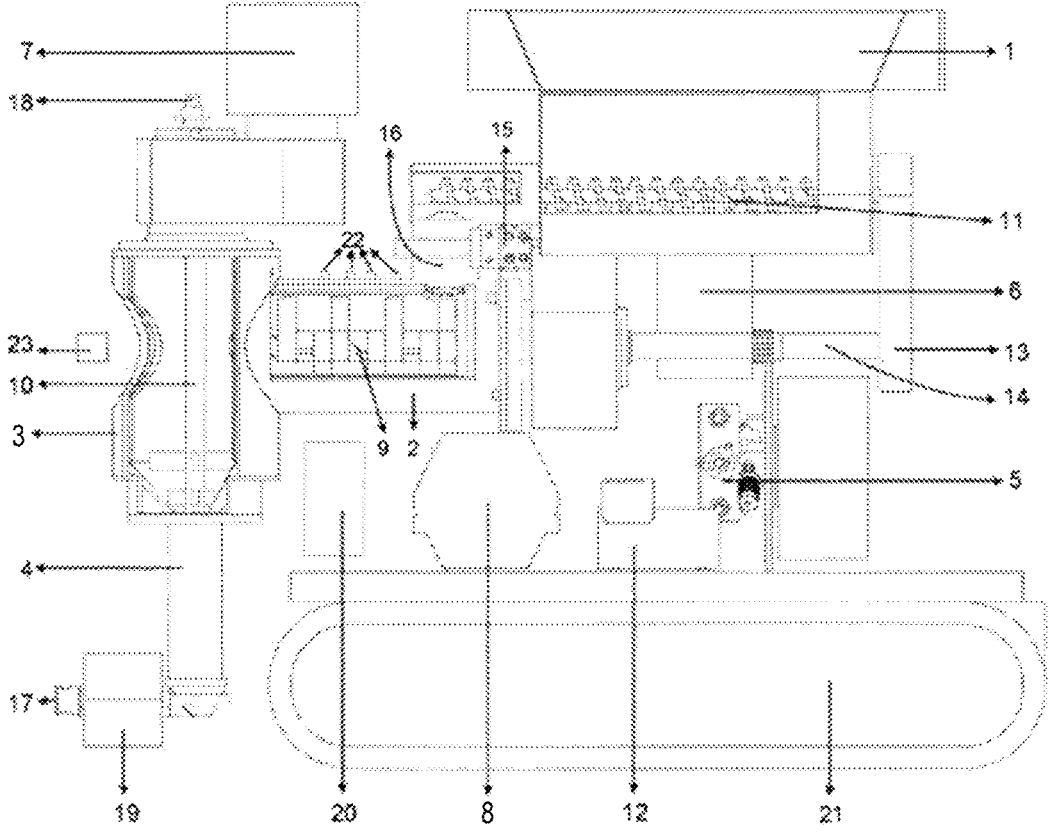
FIG. 2 shows a side view of the mixing system of the present invention.
Figure 3:
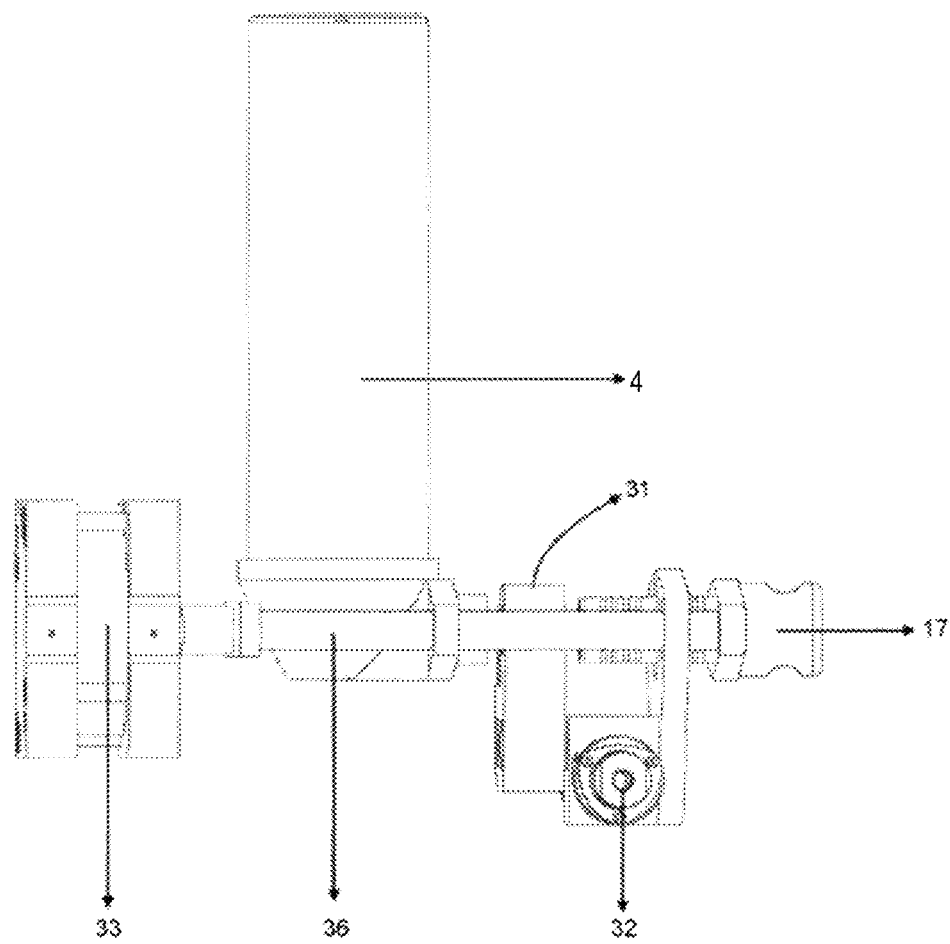
FIG. 3 shows a side view of the flushing ball release/installation mechanism of the present invention.
Figure 4:
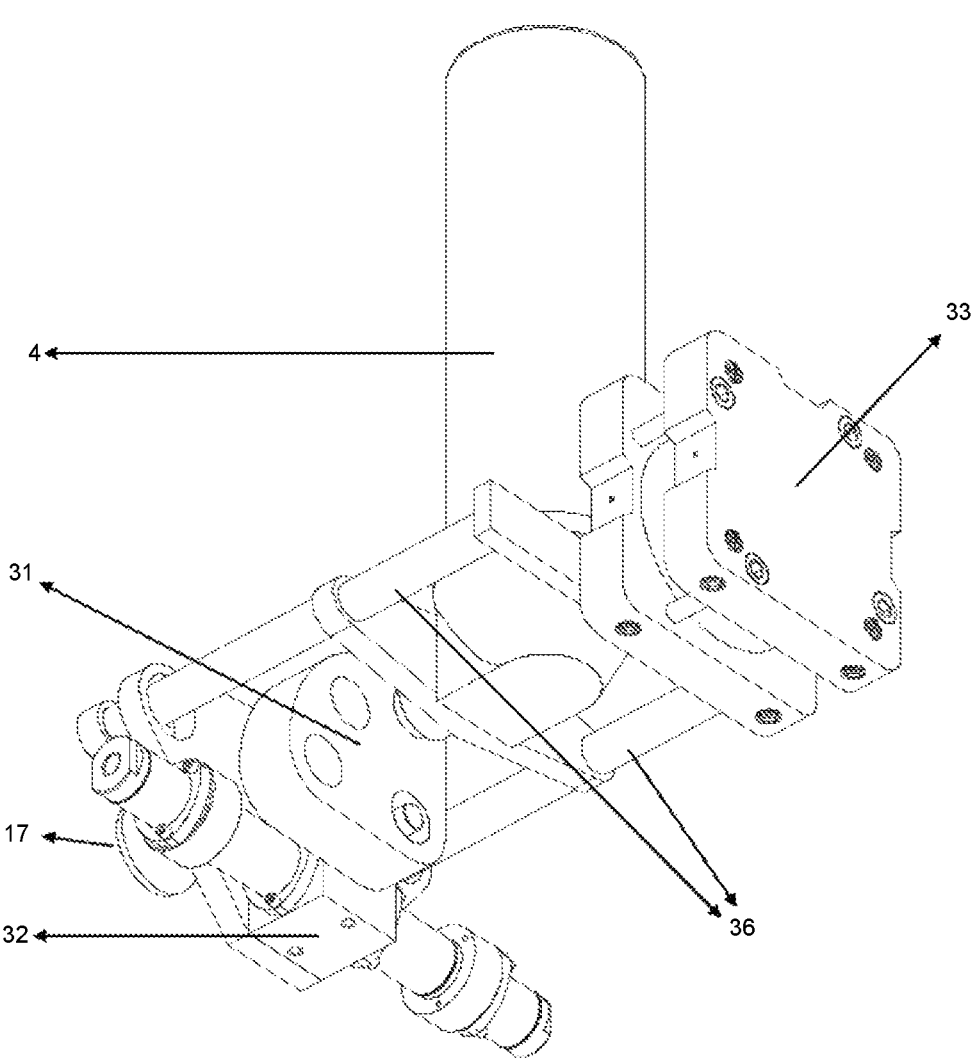
FIG. 4 shows a perspective view of the flushing ball release/installation mechanism of the present invention.
Figure 6:
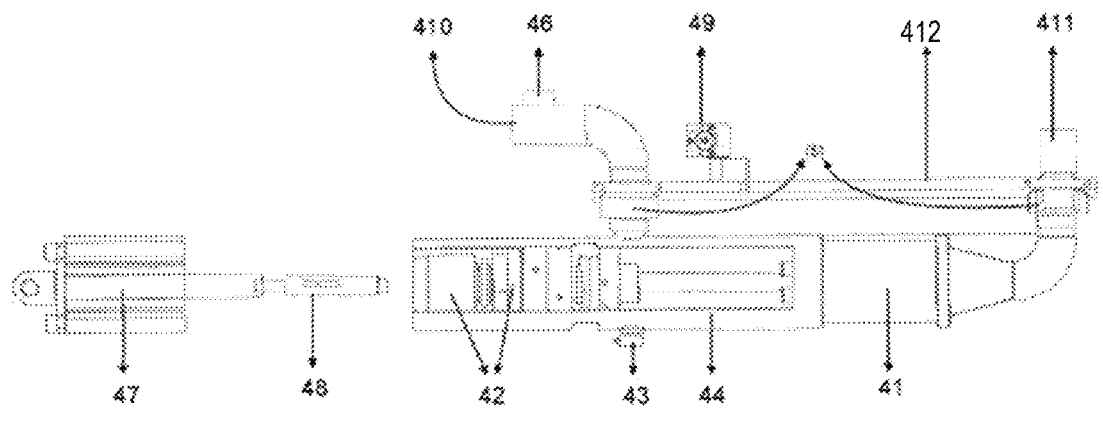
FIG. 6 shows a side view of the mixture dispenser of the present invention.
Figure 7:
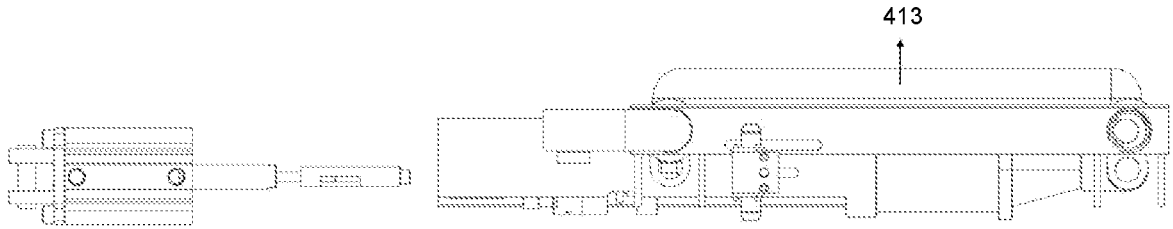
FIG. 7 shows a top view of the mixture dispenser of the present invention.

The present invention comprises three structures, represented by FIGS. 1-7, as follows:

a) A mixing system, as represented by FIGS. 1-2;

b) A flushing ball release mechanism, as represented by FIGS. 3-4; and c) A mixture dispenser, as represented by FIGS. 5-7.

The mixing system comprises the following components:

Hopper—(1);

Horizontal mixing chamber—(2);

Vertical mixing chamber—(3);

Main progressive cavity pump—(4);

Piston water dispenser—(5);

BLDC motor for horizontal mixing chamber—(6);

BLDC motor for vertical mixing chamber—(7);

High pressure pump—(8);

Horizontal kneading shaft—(9);

Vertical kneading shaft—(10);

Dry material auger—(11);

Air compressor—(12);

Pneumatic clutch—(13);

Drive shaft of the water dispenser—(14);

Pneumatic pinch cylinder (for pinching the soft hose)—(15);

Soft hose for separation of dry and wet areas—(16);

Supply line from the mixing system to the mixture dispenser—(17);

Rotary unit supplying high pressure water for cleaning the vertical chamber—(18);

Flushing ball release mechanism—(19);

Lubrication system—(20);

Tracks and/or wheels—(21);

Horizontal chamber water metering nozzles—(22);

Vertical chamber water metering nozzle—(23).

The following modes are available for the operation of the mixing system of the present invention:

Mixing/Feeding Mode. Dry material is fed into the hopper (1) using a pneumatic conveying system. The BLDC motor for the horizontal mixing chamber (6) actuates 3 mechanisms: (a) horizontal mixing shaft (9), (b) piston water dispenser (5), and (c) the dry material feed auger (11). Dry material and water are fed into the horizontal mixing chamber (2). The water is fed through water dosing nozzles (22). The horizontal mixing shaft (9) mixes the water with the dry material and forces the resulting mixture into the vertical mixing chamber (3). The vertical mixing shaft (10), while mixing the mixture material, is driven by the main progressive cavity pump (4). Then, the mixture enters the mixture supply line (17), which feeds into the mixture dispenser, the mixture dispenser being installed on the printer as close to the extruder as possible. Once the mixture has reached the dispenser and filled the main chamber of the dispenser (see FIG. 5, reference numeral 44), the force sensor of the dispenser (see FIG. 5, reference numeral 43) records the pressure as a result of the expansion of the main chamber of the dispenser (see FIG. 5, reference numeral 44), the force sensor (43) further signaling to a processor that the 3D printing device is ready to dispense.

The BLDC motor of the dispenser (i.e., the third BLDC motor, see FIG. 5, reference numeral 42) then turns on, which rotates the dosage progressive cavity pump (41) in accordance with the printer program, dosing the material in a desired quantity. The force sensor (43) sends a signal to the BLDC motor of the vertical mixing system (7), turning it on and off, or decreasing and increasing its speed, such that the pressure in the dispenser chamber (44), as sensed by the force sensor (43) is in a preferred range, e.g., between 0.1 and 40 bar.

Cleaning mode. The pneumatic clutch (13) is supplied with air via an air compressor (12). The pneumatic clutch (13), when engaged, disables the dry material auger (11) from movement by mechanically disconnecting the BLDC horizontal motor (6) from the dry material auger (11). The pneumatic clutch (13) further engages the pneumatic cylinder (15), thereby compressing the soft hose (16) and separating wet and dry areas. The BLDC horizontal motor (6) rotates the horizontal kneading shaft (9) and the drive shaft of the water dispenser (14), which rotates the piston water dispenser (5) and forces pressurized water towards the water metering nozzles (22). The horizontal mixing shaft rotates and is cleaned as it is supplied with water under pressure while the dry mixture is not fed into the horizontal mixing chamber.

An additional high-pressure pump (8) may also provide additional cleaning, which delivers pressurized water through a rotary rotating unit (18) attached to one or more vertical water metering nozzles (23) which rotates on the vertical mixing shaft (10) and cleans the vertical mixing chamber (3).

For cleaning the supply line to the printer head, the flushing ball release mechanism installs initially a first flushing ball in the mixture supply line (17). The BLDC vertical motor (7) rotates the vertical mixing shaft (10), which drives the main progressive cavity pump (4), the cavity pump (4) in turn pumping water, and the rest of any mixture, through while allowing the first flushing ball out of the turret and into the system. The first flushing ball clears the mixture supply line (17) until the ultrasonic sensor of the mixture dispenser (see FIG. 5, reference numeral 46), which provides a signal after sensing that the first flushing ball has entered the mixture dispenser. As soon as the first flushing ball enters the mixture dispenser, the line-switching mechanism is activated on the dispenser. The line-switching mechanism provides a second flushing ball, which bypasses the main progressive cavity pump (4). The second flushing ball thereby cleans the line leading to the extruder (see FIG. 5, reference numeral 411).

After some time of operation of the additional high-pressure pump (8) and the piston water dispenser (5), there should be no additional mixture residues in the mixing chambers (2, 3), and, if the ultrasonic dispenser sensor (46) has already signaled that the first flushing ball is in the dispenser, the flushing ball release mechanism provides a second flushing ball which cleans the mixture supply line (17, 22) a second time and travels through to any connected extruder/printer head. The second flushing ball is pushed through using clean water. The lubrication system (20) is then turned on to extract liquid lubricating silicone into the vertical mixing chamber. The system (20) enters the amount of water that is needed to flush the mixture supply line and, at the same time, lubricate the main progressive cavity pump (4).

The flushing ball release mechanism comprises the following components (see FIGS. 3 and 4):

Turret with mounted flushing balls (31);

Rotatable pneumatic cylinder for rotating the turret, or a rotary cylinder (32);

Clamping pneumatic cylinder (33);

Main progressive cavity pump (4);

Feed line to the dispenser (17);

Pushers 1 and 2 (36).

Working algorithm of the flushing ball release mechanism. The clamping pneumatic cylinder (33) controls the pushers 1 and 2 (36) which extrude via the mixture supply line (17) to the turret (31), and the turret (31), in turn, presses against the main progressive cavity pump (4), making the connection airtight. When the system deems it necessary to use a flushing ball, the clamping pneumatic cylinder (33) pushes the pushers 1 and 2 (36) which, in turn, disconnect the turret (31) from the main progressive cavity pump (4) and connect it instead to the supply line (17). Then, the pneumatic rotary cylinder (32) rotates the turret which contains the flushing balls. The turret (31) rotates in such a way as to connect the mixture supply line (17) and the main progressive cavity pump (4) with just the opening in which the flushing ball is located. Then, the clamping pneumatic cylinder (33) retracts the pushers 1 and 2 (36) by pressing the line, making the connection airtight.

The mixture dispenser comprises the following components (see FIGS. 5-7):

Dosage progressive cavity pump (41);

Dispenser BLDC motor with planetary gearbox (42);

Force sensor, for recording and controlling the pressure inside (43);

Dispenser main chamber (44).

The line-switching system of the mixture dispenser comprises the following components (see FIGS. 5-7):

Hollow rod hydraulic cylinder (45);

Ultrasonic sensor (46);

Pneumatic ram cylinder (47);

Pressure supply plunger, for supplying pressure to the hollow rod hydraulic cylinder (48);

Rotary cylinder, for switching channels (49);

Mixture supply line from the kneading system to the batcher (410);

Feed line of the mixture from the dispenser to the extruder (411);

Slider (412), for moving the supply lines of the mixture to bypass the dosage progressive cavity pump (41);

Bypass pipe (413).

Working algorithm of the mixture dispenser. During operation of the mixing mode, the mixture flows into the dispenser main chamber (44) and then passes into and through the dosage progressive cavity pump (41). The force sensor (43) provides signals for controlling the speed of the BLDC vertical motor (7). The hollow rod hydraulic cylinders (45) press the mixture supply lines to the inputs of the dispenser main chamber (44). The pressure in the hollow rod hydraulic cylinder (45) is created using a pneumatic ram cylinder (47) which presses on the pressure supply plunger (48).

During operation of the cleaning mode, when the first flushing ball enters the dispenser, the pneumatic ram cylinder (47) stops pressing on the plunger (48) and in turn on the hollow rod cylinder (45). The hollow rod cylinders in turn stop pressing on the mixture supply lines (410,411) and on the dispenser chamber (44). The rotary pneumatic cylinder (49) is then activated to position the slider (412) such that the supply lines (410, 411) are moved to be located above the bypass pipe (413, see FIG. 7). The pneumatic ram cylinder (47) then begins again to press on the plunger (48), and the hollow rod hydraulic cylinders (45) press the mixture supply lines (410, 411) such that the mixture flows to the bypass pipe (413) via an airtight connection.

Then, the flushing ball release/installation system provides a second flushing ball which, passing through all the lines of the system, has already passed the dosage progressive cavity pump (41), and therefore, the second flushing ball travels further along the line to clean the extruder.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A mixing and feeding system for 3-dimensional (3D) printing of buildings, comprising:

a mixing system, a flushing ball release mechanism, and a mixture dispenser, said mixing system comprising:

a hopper for inputting dry material, said hopper being coupled to a dry material auger, a horizontal mixing chamber, said horizontal mixing chamber receiving said dry material from said dry material auger, said horizontal mixing chamber also receiving water via one or more horizontal chamber water metering nozzles, said water being injected via a piston water dispenser connected to a water dispenser drive shaft, a vertical mixing chamber located after said horizontal mixing chamber, said vertical mixing chamber receiving an output of said horizontal mixing chamber and water via one or more vertical chamber water metering nozzles, said water being injected via said piston water dispenser, a main progressive cavity pump located after said vertical mixing chamber, a first brushless DC (BLDC) motor powering a horizontal kneading shaft of said horizontal mixing chamber, said piston water dispenser, and said dry material auger, a second BLDC motor powering a vertical kneading shaft of said vertical mixing chamber, a clutch for separating said dry material auger from said first BLDC motor, a cylinder for pinching a hose, said hose located between said dry material auger and said horizontal mixing chamber, and a supply line from the mixing system to said mixture dispenser, said flushing ball release mechanism being located after said main progressive cavity pump and prior to said supply line from the mixing system to the mixture dispenser, said flushing ball release mechanism comprising:

a turret, said turret holding mounted flushing balls, a rotating pneumatic cylinder rotating the turret, a clamping pneumatic cylinder, a main progressive cavity pump, and at least one pusher, said mixture dispenser being located after said supply line from the mixing system to the mixture dispenser, said mixture dispenser comprising:

a main dispensing chamber, a dosage progressive cavity pump powered by a third BLDC motor, a force sensor, said force sensor recording pressure within said mixture dispenser, the force senser outputting a signal, based on the recorded pressure, to the second BLDC motor of the vertical mixing chamber such that the second BLDC motor is controlled so as to control pressure in the mixture dispenser; and a line-switching system.

2. The system of claim 1, the water dispenser is a piston water dispenser that is connected to a water dispenser drive shaft; and an output of the piston water dispenser being based on the number of revolutions of the water dispenser drive shaft.

3. The system of claim 1, the clutch is a pneumatic clutch, and the cylinder is a pneumatic cylinder.

4. The system of claim 1, further including at least one selected from the group consisting of tracks and wheels.

5. The system of claim 1, the flushing balls include a first flushing ball and a second flushing ball, the first flushing ball is provided to pass through the supply line, and the second flushing ball is provided to pass through the supply line, and the second flushing ball being provided to be pushed through the supply line with clean water.

6. The system of claim 1, the control of the second BLDC motor includes alternatively turning the second BLDC motor on and turning the second BLDC motor off.

7. The system of claim 1, the control of the second BLDC motor includes alternatively decreasing speed of the second BLDC motor and increasing second of the BLDC motor.

8. The system of claim 1, the control of the second BLDC motor includes maintaining the pressure in the mixture dispenser in a range of 0.1 bar to 40 bar.

* * * * *